(12) United States Patent
Taylor et al.

(10) Patent No.: US 6,752,377 B1
(45) Date of Patent: Jun. 22, 2004

(54) PRESSURE RELIEF VALVE WITH SELECTABLE ORIFICE SIZE

(75) Inventors: Julian S. Taylor, Oklahoma City, OK (US); Jason O. Taliaferro, Edmond, OK (US); Mason W. Buerger, Mustang, OK (US)

(73) Assignee: Taylor Innovations L.L.C., Oklahoma City, OK (US)

( * ) Notice: Subject to any disclaimer, the term of this patent is extended or adjusted under 35 U.S.C. 154(b) by 0 days.

(21) Appl. No.: 10/351,166

(22) Filed: Jan. 24, 2003

(51) Int. Cl.[7] .......................... F16K 25/00; F16K 41/14
(52) U.S. Cl. ....................................... 251/363; 251/360
(58) Field of Search ................................. 251/356–365

(56) References Cited

U.S. PATENT DOCUMENTS

| | | |
|---|---|---|
| 3,211,174 A | 10/1965 | Weise et al. |
| 4,290,343 A | 9/1981 | Gram |
| 4,370,893 A | 2/1983 | Combes |
| 4,445,531 A | 5/1984 | Powell |
| 4,446,886 A | 5/1984 | Taylor et al. |
| 4,566,486 A | 1/1986 | Taylor et al. |
| 4,682,495 A | 7/1987 | McNeely |
| 5,108,075 A | 4/1992 | Downard et al. |
| 5,598,974 A * | 2/1997 | Lewis et al. ................. 239/135 |
| 5,901,750 A | 5/1999 | Kozinski |
| 6,158,714 A | 12/2000 | Lembcke et al. |
| 6,161,571 A | 12/2000 | Taylor |
| 6,286,534 B1 | 9/2001 | Bliss |
| 6,325,096 B1 | 12/2001 | Rising et al. |

* cited by examiner

*Primary Examiner*—Paul J. Hirsch
(74) *Attorney, Agent, or Firm*—Fellers, Snider, et al.

(57) ABSTRACT

Method and apparatus for configuring a pressure relief valve to have a desired internal orifice size. A population of nominally identical inserts are provided having different internal orifice diameters. A resilient seal ring is placed upon a selected insert and both are inserted into a cup-shaped seat body to form a valve seat assembly. The valve seat assembly is secured within a housing of the pressure relief valve in facing relationship to a moveable piston assembly which is biased against the seal in a normally closed position. When a new internal orifice size is desired, the insert is removed and replaced with a new insert having the new desired orifice size. No changes are necessary in the remaining components. The resilient seal preferably comprises a stiffener ring of rigid material surrounded by an annular ring of resilient material.

20 Claims, 11 Drawing Sheets

PRESSURE RELIEF VALVE WITH SELECTABLE ORIFICE SIZE

FIELD OF THE INVENTION

This invention relates generally to the field of pressurized fluid systems and more particularly, but not by way of limitation, to a pressure relief valve which establishes a bypass path for a pressurized fluid in the event of an overpressure condition, the relief valve configured to accommodate different internal orifice sizes which can be readily installed during field use.

BACKGROUND

Pressurized fluid systems are provided with pressure relief capabilities to prevent injury to personnel and damage to equipment in the event of an overpressure condition. An overpressure valve assembly, sometimes also referred to as a main valve or a pilot valve, can be used to establish a bypass path for the pressurized fluid.

In such a valve assembly, inlet fluid bears against a piston assembly which is biased in a closed position against a valve seat. When the pressure of the fluid generates sufficient force upon the piston assembly to overcome the bias force, the piston assembly moves to an open position away from the valve seat and the fluid flows to an outlet port.

The setpoint at which a valve assembly opens is selected based on the requirements of the system. As those skilled in the art will appreciate, a number of factors are taken into account in configuring a particular valve assembly to open at a particular pressure setpoint. These factors can include the operational pressure range for the fluid, the respective diameters of the inlet and outlet ports, the cross-sectional surface area of the piston assembly impacted by the inlet flow, the distance the piston assembly moves between the opened and closed positions, and the diameter of a restriction orifice upstream from the piston assembly used to regulate the volumetric flow through the valve once the piston assembly is opened.

It is sometimes desirable to reconfigure an existing valve assembly to have a different internal orifice size. Because the foregoing factors can be interdependent, changing over to a new orifice size can require replacement of a number of other internal components within the valve assembly as well. This can be cost and labor intensive. In some circumstances, it may be deemed more desirable to simply procure and install a new, replacement valve assembly configured from the factory with the new orifice size rather than reconfiguring an existing valve assembly in the field.

There is therefore a continued need for improvements in the art to address these and other limitations of the prior art, and it is to such improvements that the present invention is directed.

SUMMARY OF THE INVENTION

In a first aspect, presently preferred embodiments of the present invention are generally directed to a method and apparatus for configuring a pressure relief valve to have a desired internal orifice size.

The apparatus preferably comprises a valve seat assembly for use in a pressure relief valve having a moveable piston assembly which is biased against the valve seat assembly in a normally closed position and which moves away from the valve seat assembly when a pressure of an inlet pressurized fluid reaches a predetermined threshold.

The valve seat assembly preferably includes a substantially cup-shaped seat body comprising an annular wall and an inwardly directed, annular seat flange, the annular wall having opposing first and second ends, an inner surface and an outer surface. The annular seat flange extends from the first end of the annular wall to abut the piston assembly when the pressure relief valve is in the closed position.

The valve seat assembly further comprises an annular wall with opposing first and second ends, an outer surface and an inner orifice of a first diameter. The first insert slidingly engages the seat body so that the outer surface of the first insert abuts the inner surface of the seat body. In this way, the inner orifice meters a flow rate of fluid through the valve seat assembly.

The seat body is further configured to accommodate a replacement, second insert comprising an annular wall with opposing first and second ends, an outer surface and an inner orifice of a second diameter less than the first diameter. In this way, the inner orifice of the second insert meters a second flow rate of fluid through the valve seat assembly less than that provided by the inner orifice of the first insert.

Preferably, the valve seat assembly further comprises a resilient seal ring configured to be supported by the first end of the first insert and disposed between the insert and the annular seat flange of the seat body. The seal ring preferably includes an annular contact surface configured to abuttingly receive the piston assembly and establish a fluidic seal when the pressure relief valve is in the closed position, wherein the resilient seal ring is further configured to be supported by the first end of the second insert.

The seal ring further preferably comprises an annular ring of rigid material, and an annular ring of resilient material surrounding and attached to the annular ring of rigid material. The annular ring of rigid material is preferably formed of steel and the annular ring of resilient material is preferably formed of rubber. The stiffener ring resists relaxation of the seal ring over time.

The method of reconfiguring the valve seat assembly preferably comprises steps of removing the first insert from the seat body, and inserting the second insert into the seat body so that the outer surface of the second insert abuts the inner surface of the seat body.

In another aspect, presently preferred embodiments of the present invention are generally directed to a resilient seal ring for use in establishing a fluidic seal in a pressure relief valve having a moveable piston assembly which is biased against a valve seat assembly which supports the resilient seal ring when the valve is in a closed position.

The resilient seal ring preferably comprises an annular stiffener ring of rigid material, and an annular ring of resilient material surrounding and attached to the annular ring of rigid material, wherein the piston assembly compresses an annular contact surface defined by the resilient material when the valve is in the closed position.

Preferably, the rigid material comprises steel and the resilient material comprises rubber. The annular stiffener ring of rigid material preferably comprises an inner wall surface which defines an aperture through which pressurized fluid flows when the piston assembly is moved away from the valve seat assembly by a pressure of said fluid. Moreover, the annular stiffener ring of rigid material further preferably comprises a resilient material attachment surface which depends from the inner wall surface, with the annular ring of resilient material abutting the resilient material attachment surface.

These and various other features and advantages which characterize the claimed invention will be apparent from a reading of the following detailed description and a review of the associated drawings.

BRIEF DESCRIPTION OF THE DRAWINGS

FIG. 1 shows the pressure relief valve in a normally closed position, and FIG. 2 shows the pressure relief valve in an open position.

FIG. 3 provides an elevational isometric view, FIG. 4 shows a top view and FIG. 5 provides a bottom view of the piston.

FIGS. 6 and 7 show elevational isometric views, FIG. 8 is a top view and FIG. 9 is a bottom view of the disc plunger.

FIG. 10 provides an elevational isometric view, FIG. 11 provides a top view, and FIG. 12 shows a bottom view of the seal. FIG. 13 provides an elevational, cross-sectional view of an embodiment of the seal which incorporates a rigid insert.

FIG. 14 provides an elevational isometric view, FIG. 15 provides an elevational, cross-sectional view, FIG. 16 provides a top view and FIG. 17 provides a bottom view of the insert.

FIG. 18 provides an elevational isometric view, FIG. 19 provides an elevational, cross-sectional view, FIG. 20 provides a top view and FIG. 21 provides a bottom view of the seat body.

DETAILED DESCRIPTION

Figure 1:
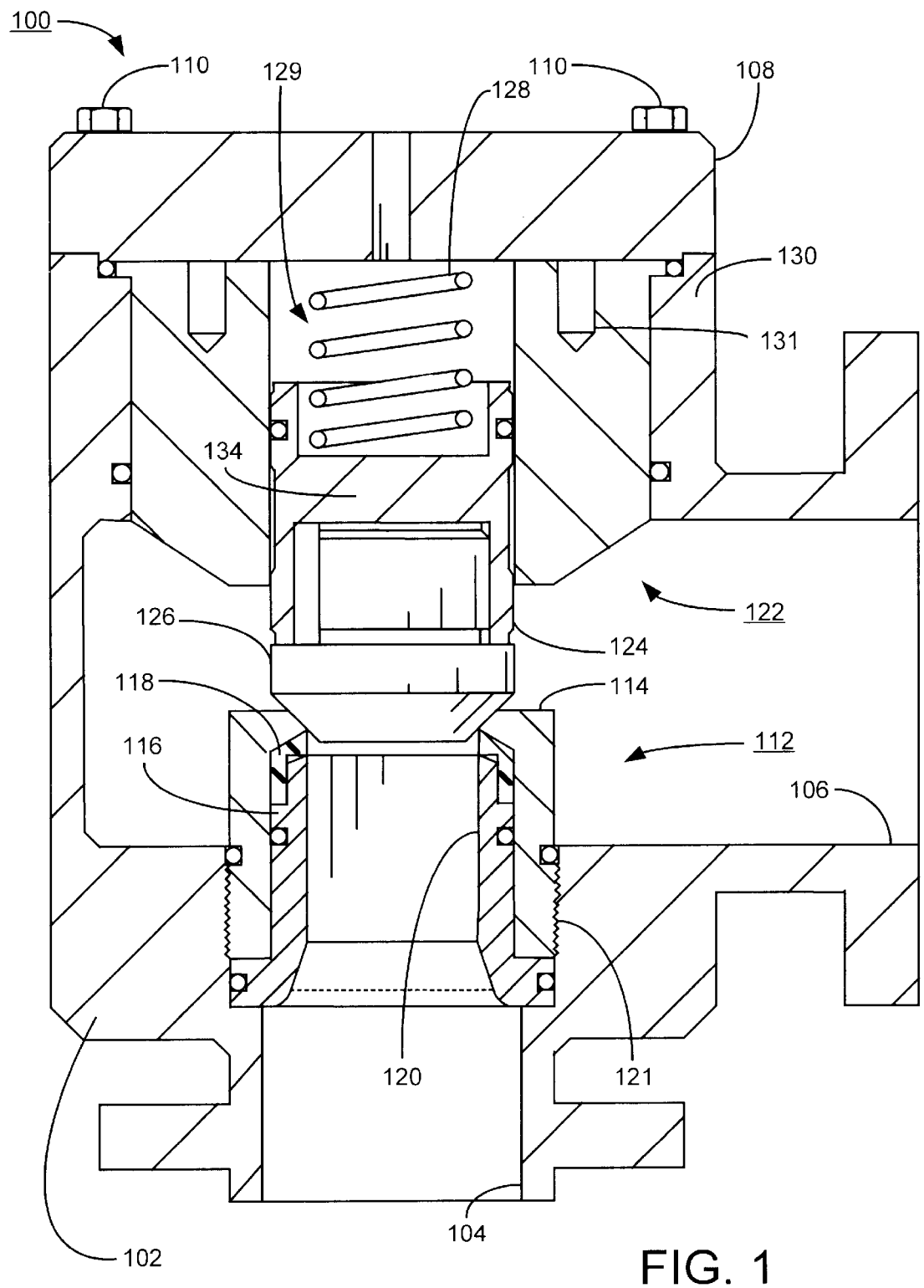
FIGS. 1 and 2 are functional block diagrams of a pressure relief valve constructed and operated in accordance with preferred embodiments of the present invention.

FIG. 1 generally illustrates a pressure relief valve 100 configured to establish a bypass path for a pressurized fluid in response to the occurrence of an overpressure condition.

The relief valve 100 includes a rigid housing 102 having an inlet port 104 and an outlet port 106. A bonnet 108 mates-with the housing 102 via fasteners 110 to form an enclosed interior within the housing 102.

A stationary valve seat assembly 112 is supported within the housing 102 and includes a seat body 114, an insert 116 and a resilient seal ring 118. The seal ring 118 fits onto the insert 116, and both are slidingly placed into the seat body 114 to complete the seat assembly. The seal ring 118 is preferred but is not necessarily required, and embodiments that provide direct metal-to-metal seals without the use of the seal ring will be discussed below.

The insert 116 includes an internal orifice 120 (throat) of selected diameter to provide a desired volumetric flow through the relief valve 100 when the assembly is in the open position. The valve seat assembly 112 threadingly engages the housing via threads 121 on an exterior surface of the seat body 114.

The relief valve 100 further includes a moveable piston assembly 122 comprising a piston 124, a disc plunger 126, a biasing spring 128 and containment sleeve 130. The piston 124 and the disc plunger 126 are biased downwardly against the seat assembly 112 by a pressure in a dome area 129 provided by a conventional pilot valve (not shown), as well as by the biasing force provided by the spring 128.

The pressure of the fluid within the dome area 129 is nominally the same as the pressure of the fluid at the inlet 104. However, the cross-sectional area of the piston assembly 122 against which the fluid within the dome area 129 impinges is larger than the cross-sectional area of the piston assembly 122 against which the fluid at the inlet impinges. This results in a net downward force that seals the disc plunger 126 against the valve seat assembly 112 in a normally closed position as shown in FIG. 1 during operation. The spring 128 further serves to keep the valve 100 in the closed position when the system is not pressurized.

Figure 2:
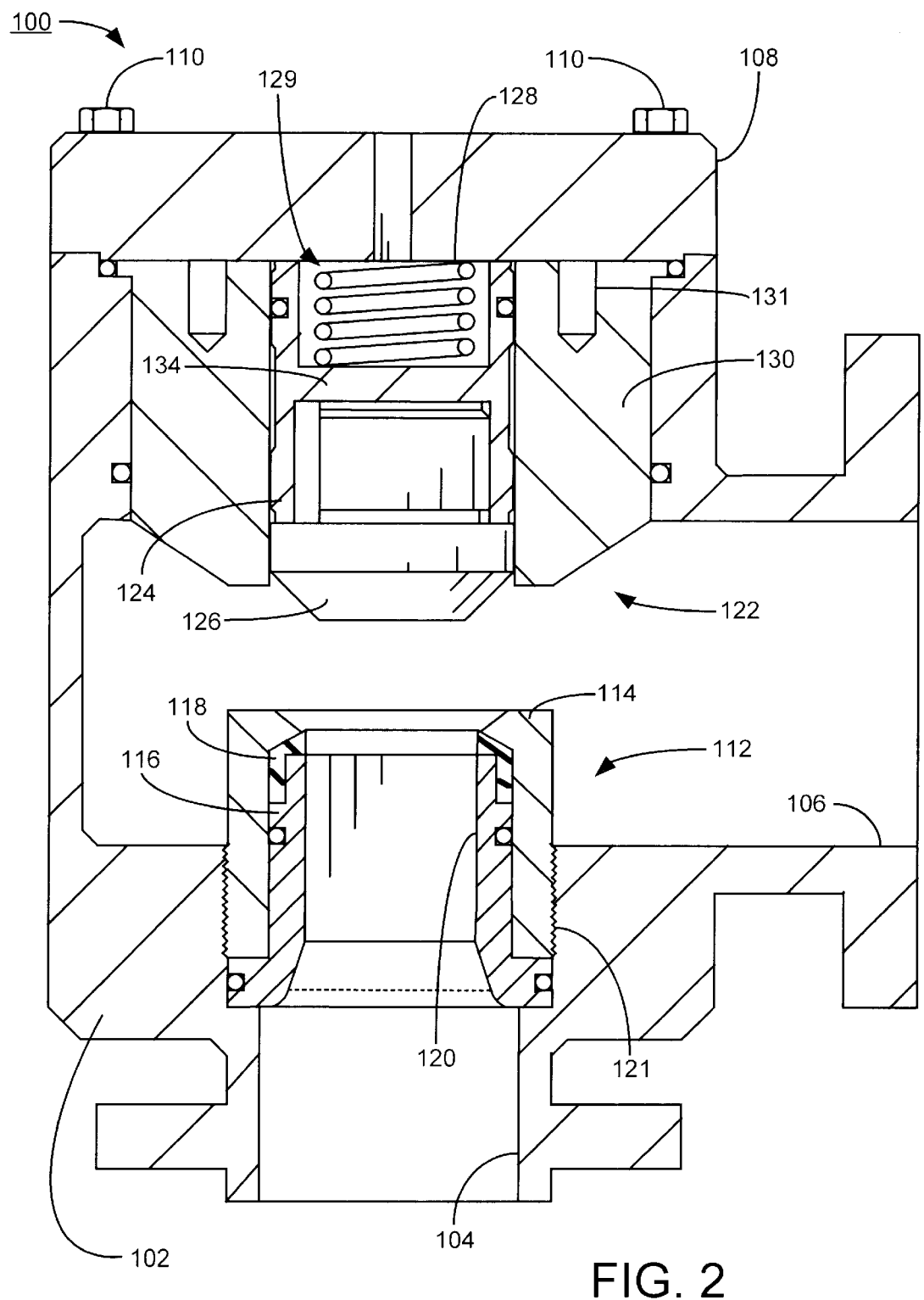

When the pressure of the fluid reaches a predetermined threshold level, the pilot valve operates to significantly reduce the pressure in the dome area 129. At this point the inlet fluid from port 104 is free to move the piston assembly 122 to the open position and flow to the outlet port 106, as shown in FIG. 2. An exemplary pilot valve is disclosed in U.S. Pat. No. 3,211,174 issued to Weise et al.

Figure 3:
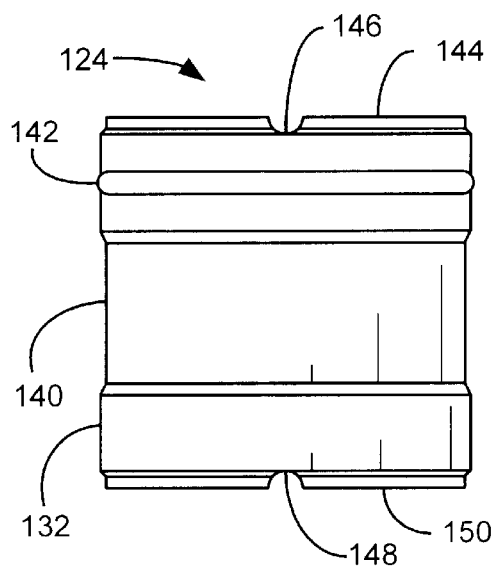
FIGS. 3–5 generally illustrate a piston of the relief valve of FIG. 1.
Figure 4:
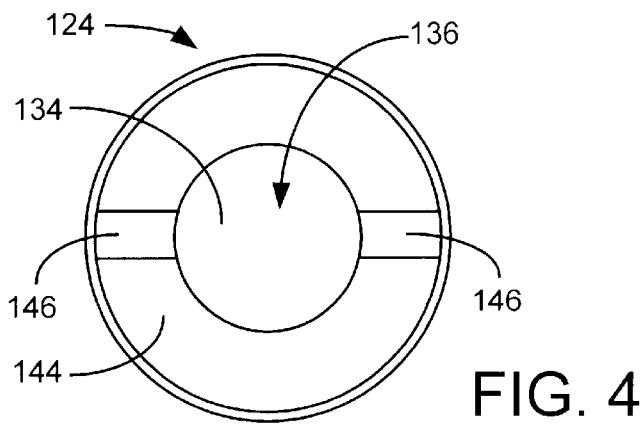
Figure 5:
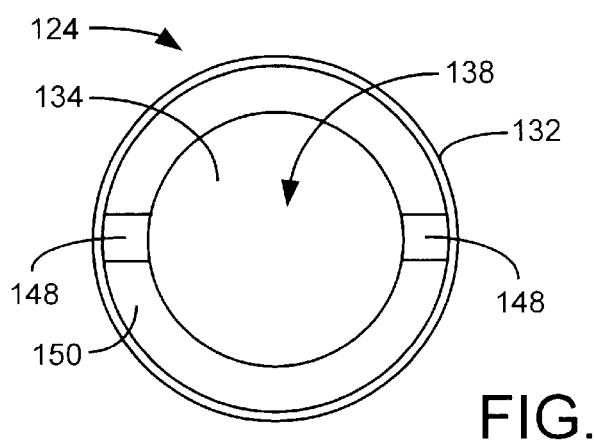
Figure 6:
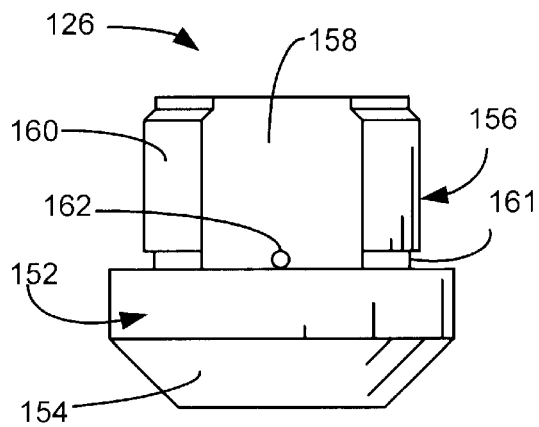
FIGS. 6–9 generally illustrate a disc plunger of the relief valve of FIG. 1.
Figure 7:
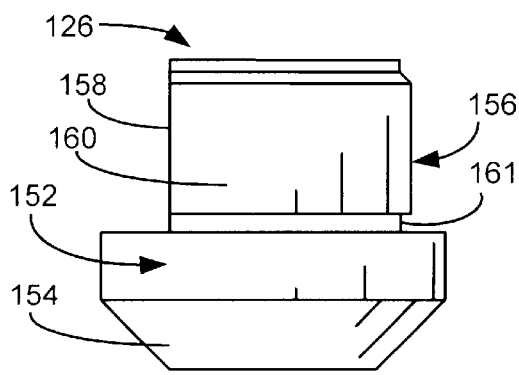
Figure 8:
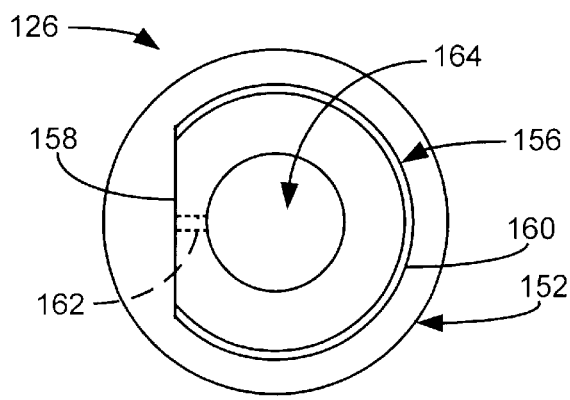
Figure 9:
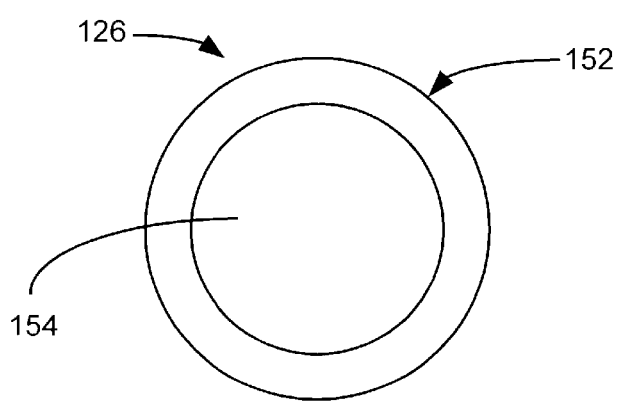

Various constituent components of the relief valve 100 will now be discussed in turn. FIGS. 3–5 show the piston 124 in greater detail. The piston 124 includes a substantially cylindrical outer wall 132 and an interior central web 134. The web 134 can be seen in cross-section in FIGS. 1 and 2, in the top plan view of FIG. 4, and the bottom plan view of FIG. 5.

The web 134 serves to divide the piston 124 to form two opposing cups, or cylindrically shaped upper and lower recesses 136, 138. The upper recess 136 faces the dome area 129 and accommodates the spring 128. The lower recess 138 faces the seat assembly 112 and accommodates the disc plunger 126.

The outer wall 132 further includes an annular recess 140 and an o-ring seal 142. A top surface 144 of the piston 124, as shown in FIG. 4, includes a radially extending recess 146, which aligns with a similarly disposed recess 148 across a bottom surface 150 of the piston 124 (FIG. 5). The recesses 148, 150 permit fluidic flow to prevent the undesired accumulation and trapping of fluid which may interfere with normal operation of the piston assembly 122.

The disc plunger 126 is shown in FIGS. 6–9 and includes a disc member 152 with a chamfered valve extension 154. The extension 154 pressingly engages the seal ring 118 and the seat body 114 (FIG. 1) when the relief valve 100 is closed. A stem 156 extends from the disc member 152 and is sized to fit within the lower recess 138 of the piston 124. As shown in top view FIG. 8, the stem is substantially "D" shaped and includes a flat surface 158 (best seen in FIG. 6) and a circumferentially extending outer surface 160. The flat surface 158 aids in establishing free sliding movement between the plunger assembly 126 and the piston 124.

A recessed surface 161 surrounds the base of the stem 156, and a small through aperture 162 (FIG. 6) extends through the flat surface into an interior cup shaped aperture 164 within the stem 156. The surface 161 and aperture 162 cooperate with the recessed groove 150 of the piston 124 (FIGS. 3 and 5) to permit draining of entrapped fluid within the lower recess 138.

While in an alternative embodiment the piston 124 and disc plunger 126 can be integrally formed as one piece, using two separate pieces as shown provides a measure of back-flow prevention when the relief valve 100 is open. With reference again to FIG. 2, should the pressure of the fluid at the outlet port 106 increase above that of the inlet port 104 so that the fluid begins flowing in the opposite direction through the relief valve 100, gravity will tend to allow the disc plunger 126 to fall back onto to the valve seat and the back flow will keep the valve 100 sealed, regardless whether the piston 124 moves back to the extended position.

Preferably, the piston 124, disc plunger 126 and sleeve 130 are formed of similar material to have a common expansion coefficient. A preferred material is 316 series stainless steel. The working surfaces can further advantageously be provided with a low friction coating to ensure free sliding movement of the various components. It will be noted that the D-shape of the stem 156 reduces the surface area contact between the plunger 126 and piston 124, thereby reducing the effects of stiction and friction that may operate in opposition to the relative motion of these components.

Figure 10:
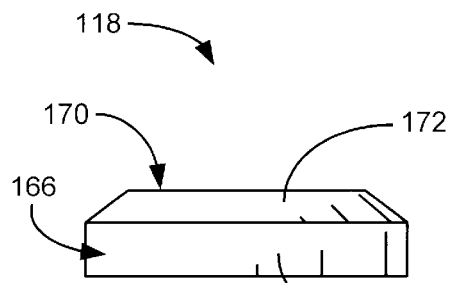
FIGS. 10–13 generally illustrate different embodiments of a resilient seal ring of the relief valve of FIG. 1.
Figure 11:
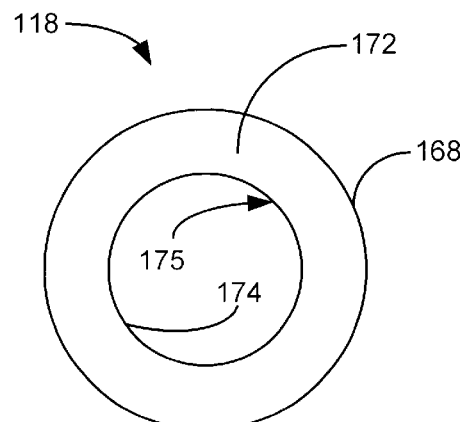
Figure 12:
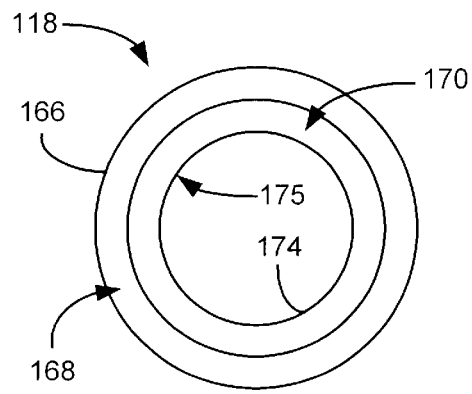

FIGS. 10–12 illustrate the seal ring 118 in greater detail. The seal ring 118 includes a cylindrically shaped body portion 166 with outer wall surface 168. The body portion supports an angled seal portion 170 with an inclined support surface 172.

As denoted in the top view of FIG. 11, a cylindrical inner wall surface 174 extends from the inclined support surface 172. The circumferentially extending junction between the inclined support surface 172 and the inner wall surface 174 provides a sealing surface 175 against which the extended portion 154 (FIGS. 6 and 7) presses to form a seal when the relief valve 100 is closed.

Figure 13:
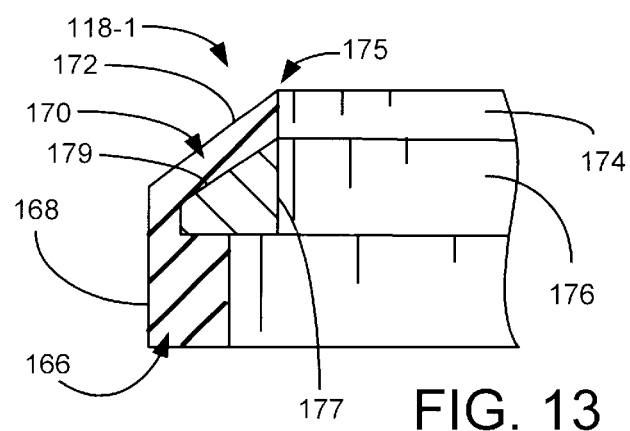
Figure 14:
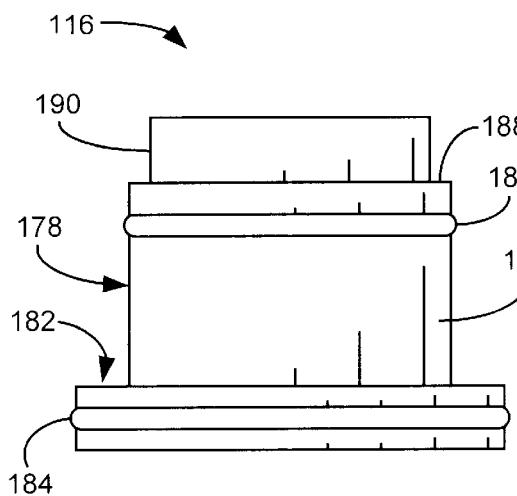
FIGS. 14–17 generally illustrate an insert of the relief valve of FIG. 1.

The resilient seal ring 118 is preferably formed from a suitable rubber or plastic material, as shown in FIGS. 1 and 2. In an alternative preferred embodiment, as shown in FIG. 13 a seal ring 118-1 is provided that is substantially identical to the seal ring 118. The seal ring 118-1, however, includes a rigid stiffener ring 176 comprising an annular ring of rigid material such as steel.

An annular ring of resilient material surrounds and is attached to the rigid material. The internal stiffener ring 176 operates to resist compression and relaxation of the seal ring 118-1 over time. The stiffener ring 176 includes an inner wall surface 177 through which the pressurized fluid flows when the valve 100 is opened, and a resilient material attachment surface 179 to which the resilient material is attached.

While resilient material is preferred, other materials can readily be used for the seal ring 118, including solid metal with a lapped or similar contact surface configured to establish a fluid tight seal with the disc plunger 126.

FIGS. 14–17 illustrate the insert 116 in greater detail. The insert 116 includes a substantially cylindrical body portion 178 with the aforementioned inner orifice 120 and an outer wall surface 180. An annular hat flange 182 radially extends outwardly from a distal end of the body portion 178 as shown. O-ring seals 184, 186 provide fluidic sealing against the housing 102 and the seat body 114, as shown in FIG. 1. Recessed shoulder surfaces 188, 190 are disposed at a proximal end of the body portion 178 opposite the flange 182 and are dimensioned to abut and support the resilient seal ring 118 (FIG. 1).

Figure 15:
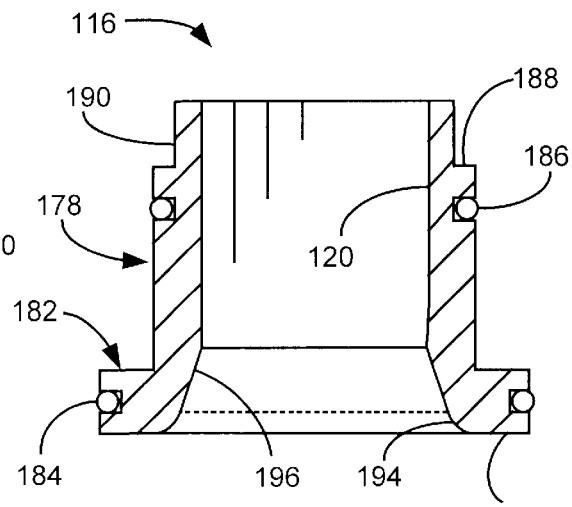
Figure 16:
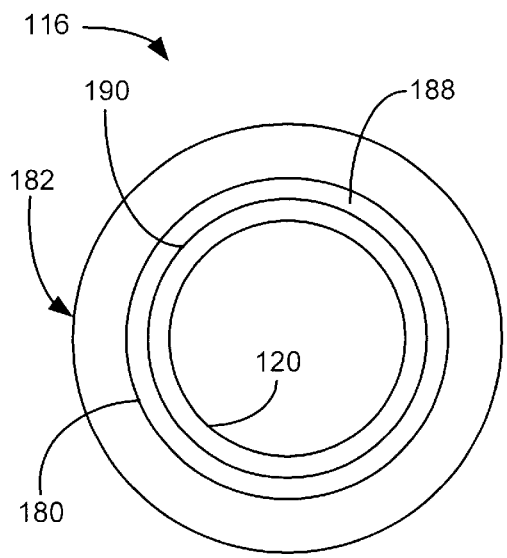
Figure 17:
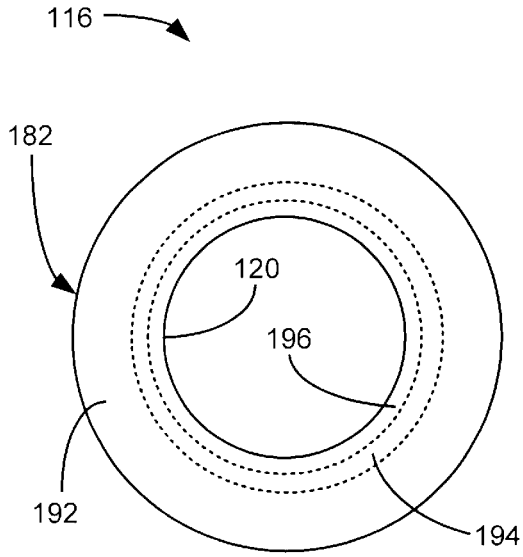
Figures 18, 19:
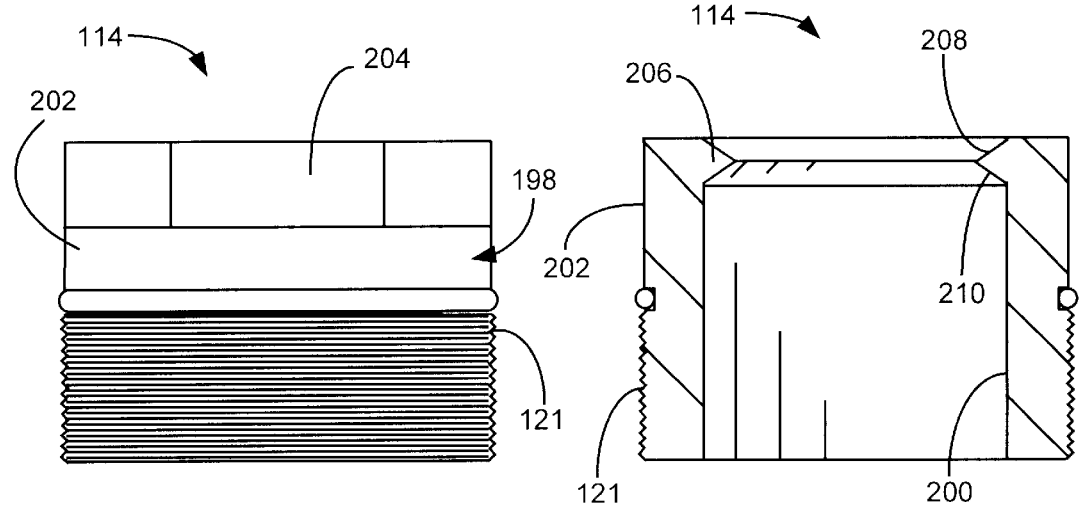
FIGS. 18–21 generally illustrate a seat body of the relief valve of FIG. 1.
Figures 20, 21:
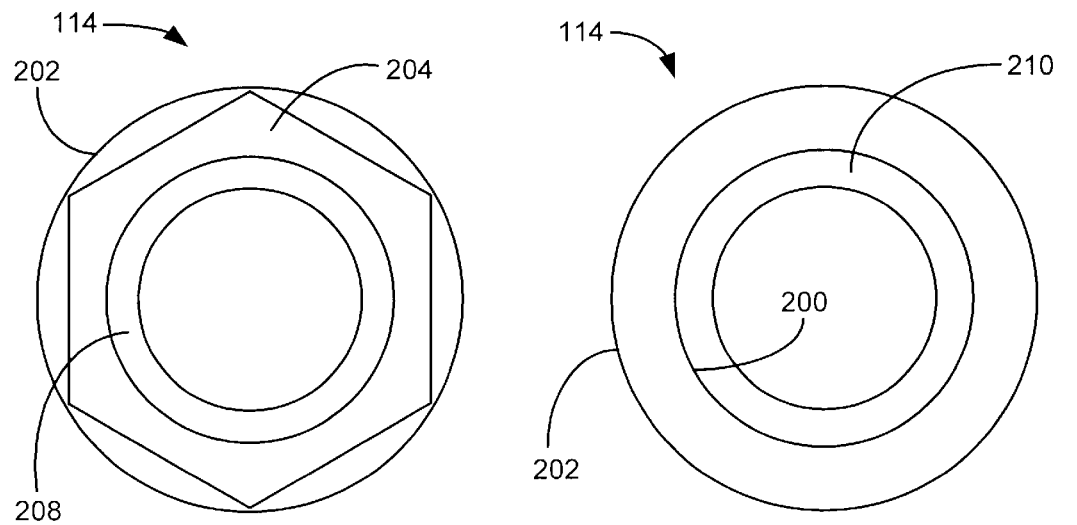

As shown in the elevational cross-sectional view of FIG. 15 and the bottom view of FIG. 17, the insert 116 has a horizontal base surface 192 configured to abut the housing 102. An interior radiused surface 194 transitions the inlet of the insert 116 to an interior conical surface 196 which extends upwardly to meet the orifice surface 120 as shown. The surface 196 can be provided with any suitable angle with respect to the vertical, such as about 15 degrees.

The seat body 114 is shown in FIGS. 18–21 to comprise a substantially cylindrical wall 198 having opposing inner and outer surfaces 200, 202. The aforementioned threads 121 used to threadingly secure the seat body 114 to the housing 102 (FIG. 1) extend about the outer surface 202. An integrated hexagonal driver surface 204 (best seen in top view FIG. 20) facilitates rotational manipulation of the seat body 114 during installation and removal using an appropriate driver tool (not shown).

A tapered, inwardly directed flange 206 includes an upper inclined surface 208 which mates with the extended portion 154 of the disc plunger 126 (FIG. 4), and a lower inclined surface 210 which abuts the inclined support surface 172 of the resilient seal ring 118 (FIG. 10).

Figure 22:
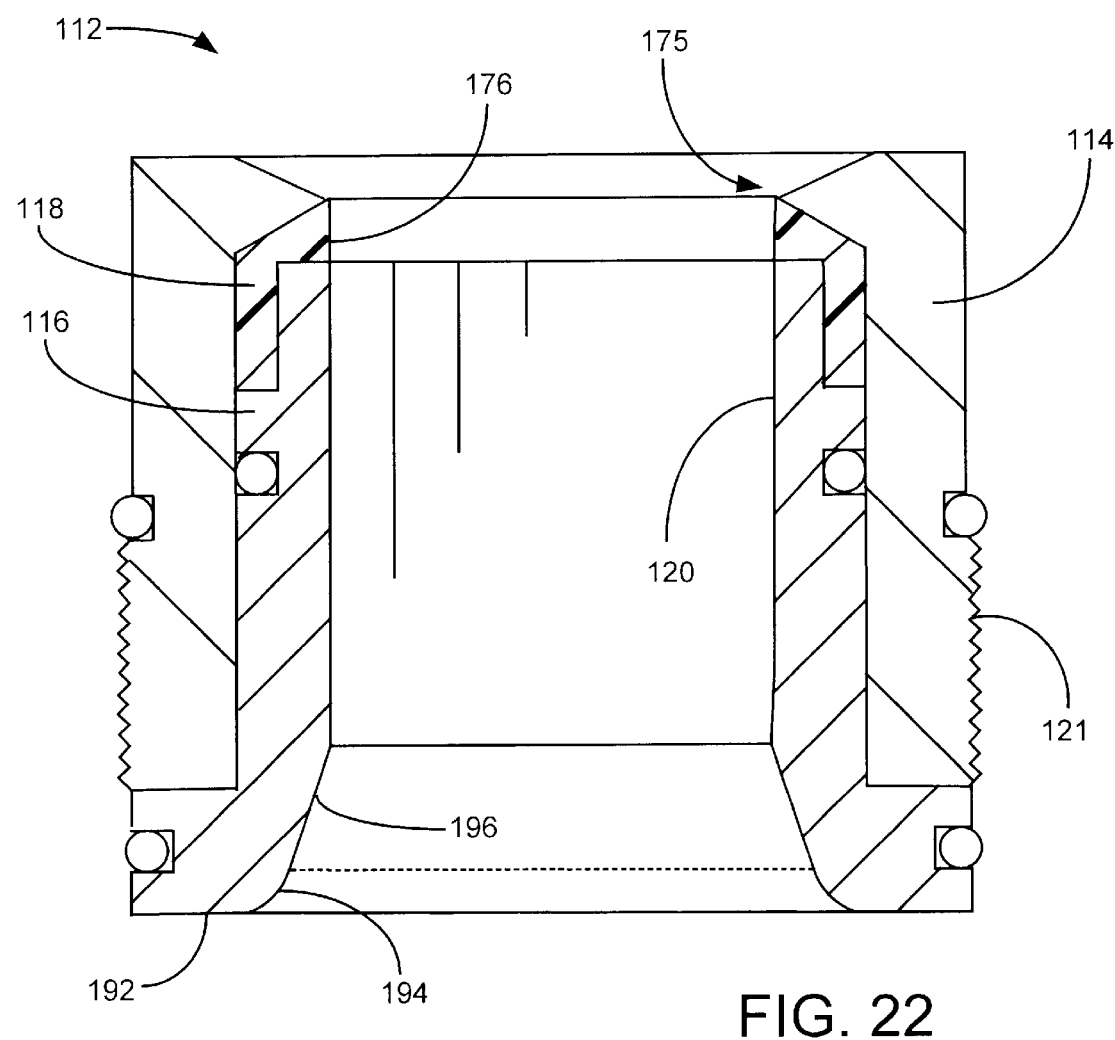
FIG. 22 provides an elevational cross-sectional view of a valve seat assembly incorporating the resililient seal, seat body and insert assembled together in accordance with a first embodiment, the insert having a first, larger internal orifice size.

The seat body 114, insert 116 and seal ring 118 are preferably assembled together to form the seat assembly 112 as shown in FIG. 22. It will be noted that the sealing surface 175 of the resilient seal ring 118 extends just beyond the tapered flange 206 of the seat body to allow seating of the disc plunger 126 onto the seal ring 118. The orifice 120 of the insert 116 is shown in FIG. 22 to have a first, relatively larger diameter.

Figure 23:
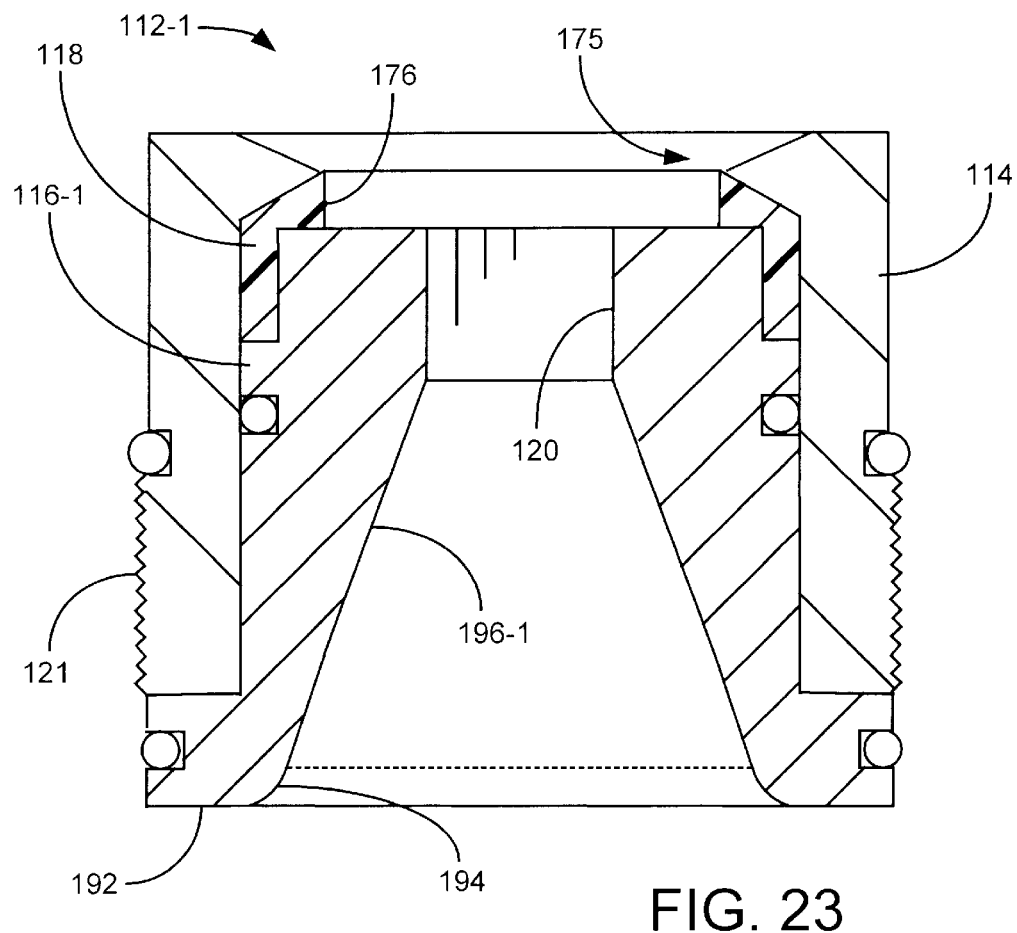
FIG. 23 provides an elevational cross-sectional view of another valve seat assembly utilizing the resilient seal ring and seat body of FIG. 22 in combination with another insert having a second, smaller internal orifice size.
Figure 24:
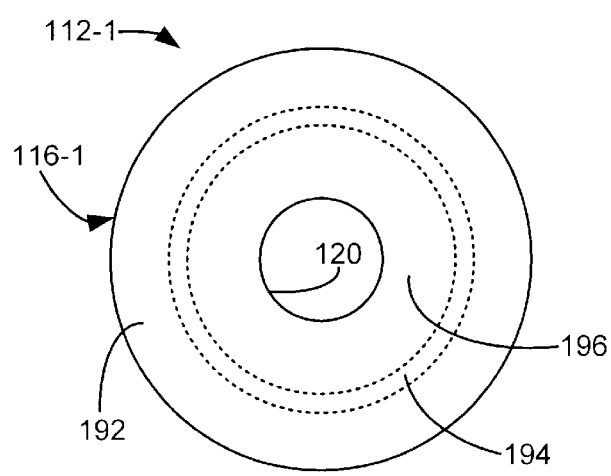
FIG. 24 provides a bottom view of the valve seat assembly of FIG. 23.

By contrast, FIG. 23 shows a second seat assembly 112-1 having a second insert 116-1 in combination with the seat body 114 and seal ring 118 of FIG. 22. FIG. 24 shows a bottom view of the second seat assembly 112-1.

Figure 25:
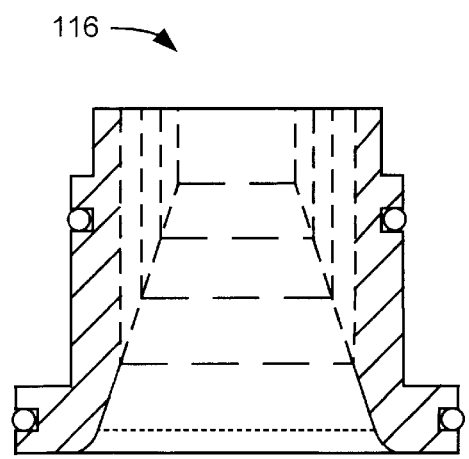
FIG. 25 represents a population of inserts having different internal orifice sizes.

The insert 116-1 in FIGS. 23 and 24 is nominally identical to the insert 116 in FIG. 22, except that the insert 116-1 has an orifice 120-1 with a substantially smaller diameter. This is preferably accomplished by shortening the extent of the interior orifice surface 120-1, and lengthening the interior conical surface (denoted at 194-1). FIG. 25 shows a population of nominally identical inserts 116 each having different interior orifice sizes that can be used with the seat body 114 and seal ring 118. The different orifice sizes are obtained by providing interior conical surfaces with the same angular incline, but with different lengths.

The different inserts shown in FIG. 25 can all be substituted within the same system. That is, there is no need to resize any of the remaining components within the relief valve 100 (seal 118, seat body 114, piston 124, plunger 126, spring 128, sleeve 130), or to reconfigure or adjust the pilot valve, when a first insert is replaced by a second insert having a different orifice size.

Figure 26:
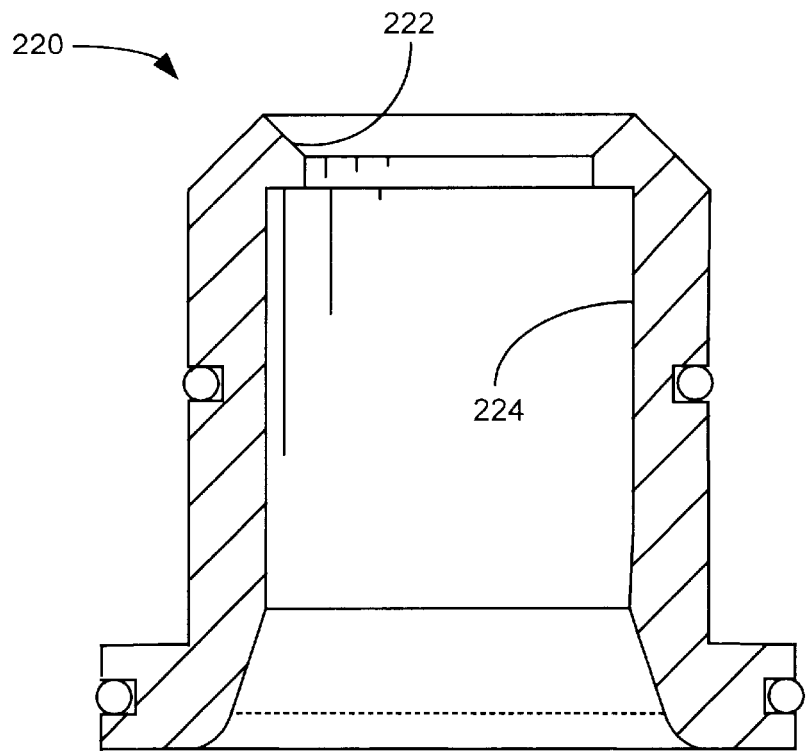
FIG. 26 provides an elevational cross-sectional view of an insert configured in accordance with another preferred embodiment, the insert providing a metal-to-metal seal with the disc plunger and thereby eliminating the need for the resilient seal ring.

The embodiments discussed thus far have utilized a seal ring (whether resilient 118, with an embedded stiffener 118-1, or metal). FIG. 26 illustrates another insert 220 configured to operate within the relief valve 100 with an integral sealing surface 222 against which the disc plunger 126 rests to form a fluidic seal. The insert 220 is preferably formed from rigid material, such as 316 stainless steel.

The sealing surface 222 is lapped or otherwise machined to establish the valve seat dimensions necessary to mate with the disc plunger 126. As with the embodiments discussed above, the mating surfaces within the valve can be any desired shape including conical, spherical, hemispherical, etc. The insert 220 has a first orifice 224 of selected diameter.

Figure 27:
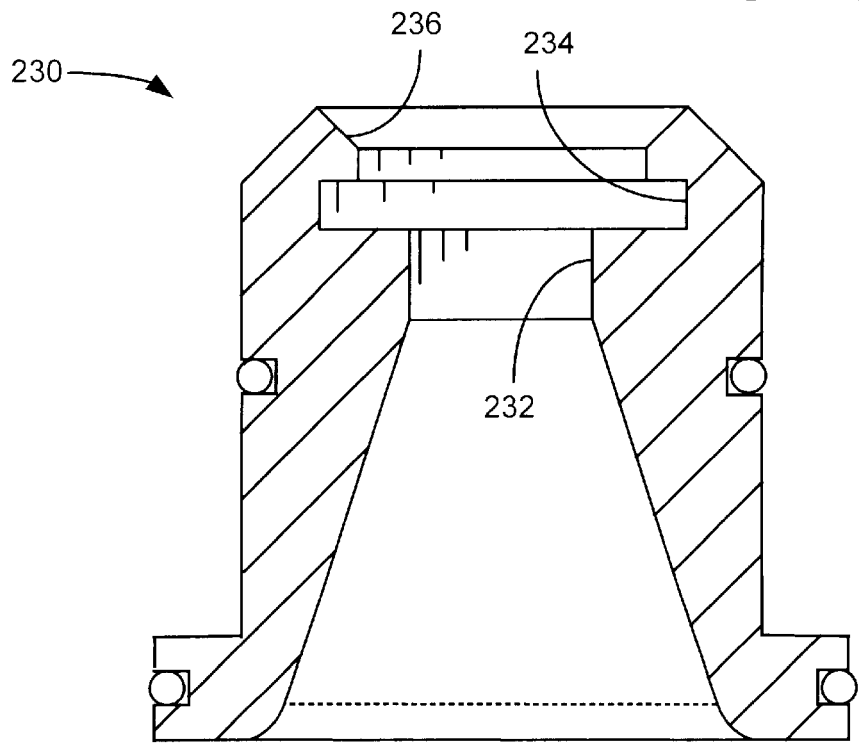
FIG. 27 provides an elevational cross-sectional view of another insert that uses a metal-to-metal seal, the insert of FIG. 27 having a smaller internal orifice size as compared to the insert of FIG. 26.

FIG. 27 illustrates yet another insert 230 nominally identical to the insert 220 in FIG. 26, but having a second, smaller internal orifice 232. It will be noted that a throat area 234 adjacent a contact surface 236 has the same diameter as the first orifice 224 to allow the second insert 230 to operate at the same set point as the first insert 220.

Figures 28, 29:
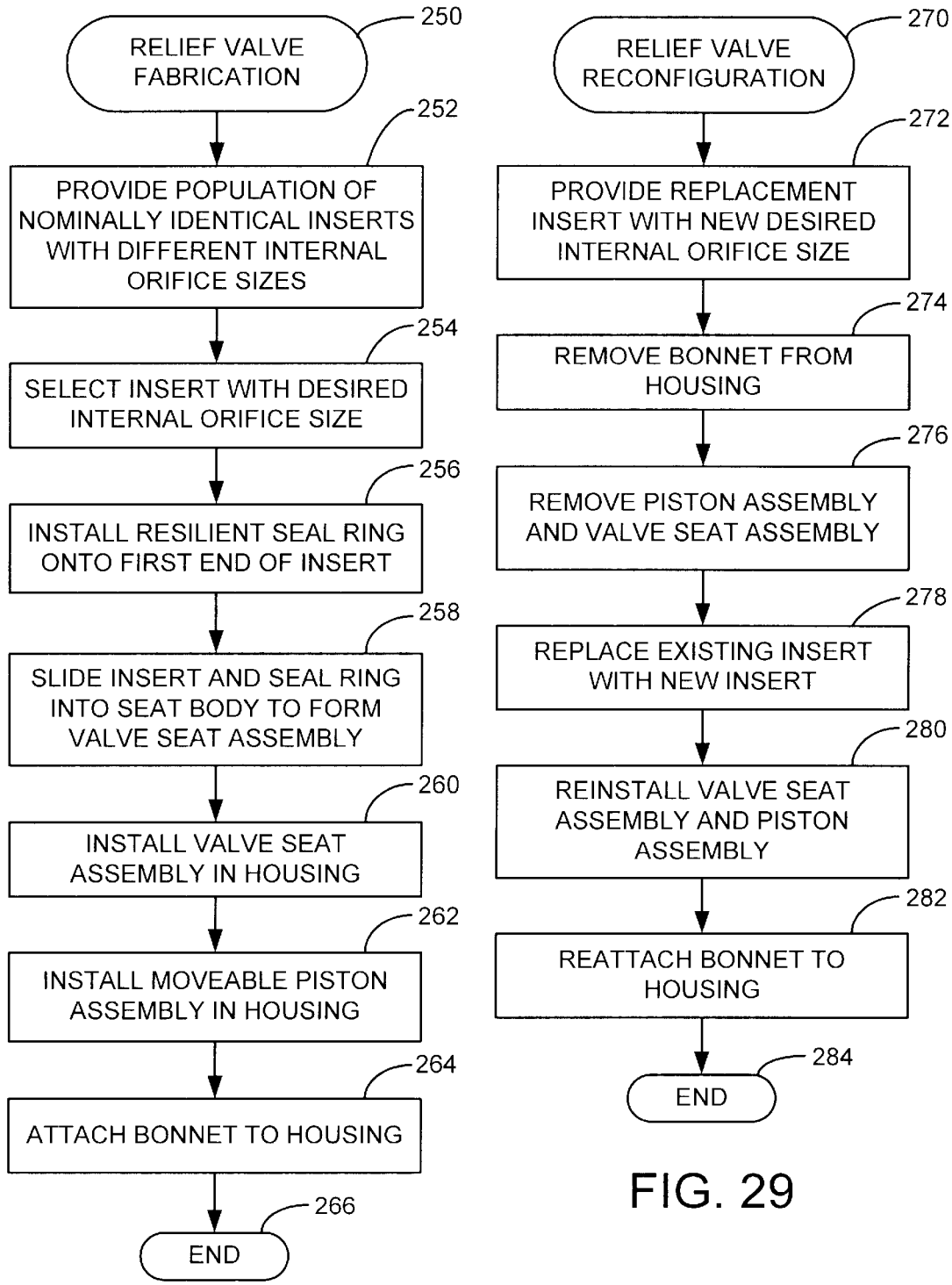
FIG. 28 is a flow chart for a RELIEF VALVE FABRICATION routine generally illustrative of steps carried out in accordance with preferred embodiments to fabricate a pressure relief valve such as shown in FIG. 1.
FIG. 29 is a flow chart for a RELIEF VALVE RECONFIGURATION routine generally illustrative of steps carried out in accordance with preferred embodiments to reconfigure an existing pressure relief valve to a new internal orifice size.

FIG. 28 provides a flow chart for a RELIEF VALVE FABRICATION routine 250, generally illustrative of preferred steps to assemble the pressure relief valve 100 shown in FIG. 1. The routine 250 is preferably carried out in a high volume manufacturing environment in which multiple relief valves are assembled.

As shown by step 252, a population of nominally identical inserts 116 with different internal orifice sizes is provided, such as represented by FIGS. 25–27. A selected insert having a desired internal orifice size for the relief valve 100 is identified at step 254.

As desired, a seal ring (such as 118 or 118-1) is next installed onto a first end of the selected insert at step 256. This step is omitted when the insert is provided with an integral sealing surface, as the embodiments shown in FIGS. 26 and 27. The insert (or insert and seal ring) are next slidingly placed within the seat body 114 to form the valve seat assembly 112 at step 258.

At step 260, the valve seat assembly 112 is installed into the housing 102. This is preferably carried out by using an appropriate driver tool (not shown) to rotate the valve seat assembly 112 and cause the threads 121 on the seat body 114 to engage the housing.

The moveable piston assembly 122 (comprising the aforedescribed piston 124, disc plunger 126, spring 128 and sleeve 130) is next installed into the housing at step 262. At step 264, the bonnet 108 is attached to the housing 102 using the fasteners 110. As the bonnet 108 is installed, the spring 128 is compressed, biasing the piston assembly 122 against the valve seat assembly 112. Other conventional steps are carried out to complete the assembly, including configuring the pilot valve assembly, etc. The process then ends at step 264.

At this point it will be noted that an advantage of the fabrication routine of FIG. 26 is that a population of nominally identical pressure relief valves with different internal orifice sizes can be assembled using all the same components except for the insert 116. For each particular relief valve, all that is required is to identify the desired orifice size and install the appropriate insert. This significantly simplifies the assembly and inventory control processes, reduces costs and improves quality.

FIG. 29 provides a flow chart for a RELIEF VALVE RECONFIGURATION routine 270, generally illustrative of preferred steps carried out to reconfigure an existing relief valve 100 to have a new, different orifice size. The routine of FIG. 29 can be carried out in the field at a user site, or during a reconfiguration operation at a warranty/repair facility.

To provide an illustrative example to aid in the present discussion, it will be contemplated that the routine is carried out to replace the larger orifice insert 116 shown in FIG. 22 with the smaller orifice insert 116-1 shown in FIG. 23.

At step 272, the replacement insert 116-1 having the new desired internal orifice size is obtained. The bonnet 108 is removed from the housing 102 at step 274 and the piston assembly 122 and valve seat assembly 112 are removed at step 276.

At step 278, the existing insert 116 is replaced by the new, replacement insert 116-1. This includes steps of sliding the existing insert and seal ring 118 out of the seal body 114, taking the seal ring 118 off of the existing insert 116 and placing it on the new insert 116-1, and sliding the replacement insert 116-1 and seal ring 118 back into the seal body 114. It will be noted, of course, that inserts that provide an integrated sealing surface (e.g., FIGS. 26 and 27) will omit operations with regard to the seal ring during this step.

The reconfigured valve seat assembly 112 and the piston assembly 122 are then reinstalled into the housing 102 at step 280, as before. The bonnet 108 is reattached to the housing 102 to compress the spring 128 and bias the piston assembly 122 against the valve seat assembly 122 at step 282. The system is then placed back into an operational state, and the process ends at step 284.

Preferably, the internal components of the relief valve 100 are inspected during the reconfiguration routine 270 to ensure that no damage or excessive wear has occurred, and such components can be replaced as necessary. Moreover, the new insert 116-1 can be provided with a new seal ring 118 as a matter of course to ensure the reconfigured valve 100 operates as intended and does not leak. However, it is contemplated that the only component that requires replacement to resize the orifice is the insert 116.

The reconfiguration routine of FIG. 27 therefore provides several advantages over the prior art. By only replacing the insert 116, the reconfiguration operation can be quickly and easily carried out in a minimum of time. There is no need (except in the case of excessive wear or damage) to replace any of the remaining components, or to make any mechanical adjustments to the system. This greatly simplifies and reduces the cost of the reconfiguration operation. Moreover, because the valve 100 will open at the same desired pressure set point regardless of the size of the internal orifice, the risk of inadvertently setting the valve to a different set point as a result of an orifice change is averted.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the filter assembly without departing from the spirit and scope of the present invention.

In addition, although the embodiments described herein are generally directed to providing a bypass relief valve that can accommodate different internal orifice sizes, it will be appreciated by those skilled in the art that the embodiments disclosed herein can be used for other types of systems without departing from the spirit and scope of the claimed invention.

What is claimed is:

1. A valve seat assembly for use in a pressure relief valve having a moveable piston assembly which is biased against the valve seat assembly in a normally closed position and which moves away from the valve seat assembly when a pressure of an inlet pressurized fluid reaches a predetermined threshold, the valve seat assembly comprising:

a substantially cup-shaped seat body comprising an annular wall and an inwardly directed, annular seat flange, the annular wall having opposing first and second ends, an inner surface and an outer surface, wherein the annular seat flange extends from the first end of the annular wall to abut the piston assembly when the pressure relief valve is in the closed position; and a first insert comprising an annular wall with opposing first and second ends, an outer surface and an inner orifice of a first diameter, wherein the first insert slidingly engages the seat body so that the outer surface of the first insert abuts the inner surface of the seat body, the inner orifice metering a flow rate of fluid through the valve seat assembly;

wherein the seat body is further configured to accommodate a replacement, second insert comprising an annular wall with opposing first and second ends, an outer surface and an inner orifice of a second diameter less than the first diameter, the inner orifice of the second insert metering a second flow rate of fluid through the valve seat assembly less than that provided by the inner orifice of the first insert.

2. The valve seat assembly of claim 1, further comprising a resilient seal ring configured to be supported by the first end of the first insert and disposed between the insert and the annular seat flange of the seat body, the seal ring having an annular contact surface configured to abuttingly receive the piston assembly and establish a fluidic seal when the pressure relief valve is in the closed position, wherein the resilient seal ring is further configured to be supported by the first end of the second insert.

3. The valve seat assembly of claim 1, wherein the valve seat assembly is reconfigured by steps comprising:

removing the first insert from the seat body; and inserting the second insert into the seat body so that the outer surface of the second insert abuts the inner surface of the seat body.

4. The valve seat assembly of claim 1, wherein the inner orifice surface of the first insert extends from the first end of the annular wall of the first insert to a medial portion of said annular wall, and wherein said annular wall further comprises an inclined, interior first conical surface which tapers from the second end of said annular wall to the inner orifice surface of the first insert, the first conical surface defining an inlet aperture at the second end having a diameter larger than the first diameter of the internal orifice defined by the inner orifice surface.

5. The valve seat assembly of claim 4, wherein the inner orifice surface of the second insert extends from the first end of the annular wall of the second insert to a medial portion of said annular wall, and wherein said annular wall further comprises an inclined, interior second conical surface which tapers from the second end of said annular wall to the inner orifice surface of the second insert, and wherein the second conical surface defines a second inlet aperture at the second end of the second insert nominally equal to the diameter of the inlet aperture at the second end of the first insert.

6. The valve seat assembly of claim 5, wherein the first conical surface extends at an inclined angle substantially equal to an inclined angle at which the second conical surface extends.

7. The valve seat assembly of claim 1, wherein the outer surface of the annular wall of the seat body further comprises threads which engage a threaded aperture in a housing of the pressure relief valve to secure the valve seat assembly to the housing.

8. The valve seat assembly of claim 2, wherein the resilient seal ring comprises:

an annular ring of rigid material; and an annular ring of resilient material surrounding and attached to the annular ring of rigid material.

9. The valve seat assembly of claim 8, wherein the rigid material comprises steel.

10. The valve seat assembly of claim 8, wherein the resilient material comprises rubber.

11. A method for configuring a pressure relief valve, comprising:

providing a population of nominally identical inserts each comprising an annular wall with opposing first and second ends, an outer surface and an inner orifice surface, wherein the inner orifice surface of a first insert from the population defines an orifice having a first diameter and wherein the inner orifice surface of a second insert from the population defines an orifice having a second diameter;

placing a resilient seal ring onto the first end of the first insert;

sliding the first insert and the resilient seal ring into a substantially cup-shaped seat body to form a valve seat assembly, the seat body comprising an annular wall and an inwardly directed, annular seat flange, the annular wall of the seat body having opposing first and second ends, an inner surface and an outer surface so that the outer surface of the first insert abuts the inner surface of the seat body; and installing the valve seat assembly into a rigid housing of the pressure relief valve in a facing relationship to a moveable piston assembly which establishes a fluidic seal against the resilient seal ring when the pressure relief valve is in a closed position.

12. The method of claim 11, further comprising:

removing the valve seat assembly from the housing;

removing the first insert and the resilient seal ring from the seat body;

placing the resilient seal ring onto the first end of the second insert; and sliding the seal ring and the second insert into the seat body so that the outer surface of the second insert abuts the inner surface of the seat body, thereby forming a second valve seat assembly with an orifice at the second diameter.

13. The method of claim 12, further comprising:

installing the second valve seat assembly into the rigid housing of the pressure relief valve in a facing relationship to the moveable piston assembly which establishes a fluidic seal against the resilient seal ring when the pressure relief valve is in the closed position.

14. The method of claim 11, wherein the inner orifice surface of the first insert of the providing step extends from the first end of the annular wall of the first insert to a medial portion of said annular wall, and wherein said annular wall further comprises an inclined, interior first conical surface which tapers from the second end of said annular wall to the inner orifice surface of the first insert, the first conical surface defining an inlet aperture at the second end having a diameter larger than the first diameter of the internal orifice defined by the inner orifice surface.

15. The method of claim 14, wherein the inner orifice surface of the second insert of the providing step extends from the first end of the annular wall of the second insert to a medial portion of said annular wall, and wherein said annular wall further comprises an inclined, interior second conical surface which tapers from the second end of said annular wall to the inner orifice surface of the second insert, and wherein the second conical surface defines a second inlet aperture at the second end of the second insert nominally equal to the diameter of the inlet aperture at the second end of the first insert.

16. The method of claim 15, wherein the providing step further comprises configuring the first conical surface and the second conical surface to extend at a common inclined angle.

17. The method of claim 15, wherein the installing step further comprises rotating the valve seat assembly so that threads in the outer surface of the seat body engage a threaded aperture in the housing to secure the valve seat assembly to the housing.

18. The method of claim 11, wherein the placing step comprises configuring the resilient seal ring to comprise an annular ring of resilient material which surrounds and is attached to an inner, annular ring of rigid material.

19. The method of claim 18, wherein the rigid material of the resilient seal ring of the placing step comprises steel.

20. The method of claim 18, wherein the resilient material of the resilient seal ring of the placing step comprises rubber.

* * * * *